US012810162B1

(12) United States Patent
Can et al.

(10) Patent No.: US 12,810,162 B1
(45) Date of Patent: Nov. 24, 2026

(54) MULTI-CLUSTER BASED SEMI-SUPERVISED ANOMALY DETECTION

(71) Applicant: Amazon Technologies, Inc., Seattle, WA (US)

(72) Inventors: Bugra Can, Newark, NJ (US); Sergul Aydore, Brooklyn, NY (US); Baris Coskun, Glen Rock, NJ (US); Wei Ding, Issaquah, WA (US); Qian Cui, Sammamish, WA (US); Oleg Yurievich Polyakov, Allendale, NJ (US)

(73) Assignee: Amazon Technologies, Inc., Seattle, WA (US)

( * ) Notice: Subject to any disclaimer, the term of this patent is extended or adjusted under 35 U.S.C. 154(b) by 1166 days.

(21) Appl. No.: 17/548,088

(22) Filed: Dec. 10, 2021

(51) Int. Cl.
*G06N 3/088* (2023.01)
*G06N 3/045* (2023.01)

(52) U.S. Cl.
CPC ............. *G06N 3/088* (2013.01); *G06N 3/045* (2023.01)

(58) Field of Classification Search
CPC ............................... G06N 3/088; G06N 3/045
See application file for complete search history.

(56) References Cited

U.S. PATENT DOCUMENTS 10,540,578 B2 * 1/2020 Madani ................ G06V 10/774
2016/0203316 A1 * 7/2016 Mace .................... G06F 21/316 726/23
2017/0063656 A1 * 3/2017 Vidyarthi ............ H04L 41/0631
2017/0161105 A1 * 6/2017 Barrett .................. G06F 9/4881
2019/0205794 A1 * 7/2019 Hsu ........................ G06N 20/20
2020/0210782 A1 * 7/2020 Servajean ............. G06F 18/295
2020/0351283 A1 * 11/2020 Salunke .............. H04L 63/1425
2020/0380338 A1 * 12/2020 Matsumura ....... G06F 18/24137
2020/0380570 A1 * 12/2020 Ramakrishnan .... G06F 18/2148

FOREIGN PATENT DOCUMENTS

WO WO-2021139249 A1 * 7/2021 .......... G06F 11/3065

OTHER PUBLICATIONS

Zhu, Qiuyu et al., "Semi-supervised learning method based on predefined evenly-distributed class centroids", Jan. 13, 2020, Arxiv, arXiv:2001.04092, pp. 3-4 (Year: 2020).*
Gerych, Walter et al., "Versatile Anomaly Detection with Outlier Preserving Distribution Mapping Autoencoders", Nov. 14, 2019, ICLR 2020 Conference, pp. 1-8 (Year: 2019).*

(Continued)

*Primary Examiner* — Haimei Jiang
*Assistant Examiner* — Thomas Bernard Lane
(74) *Attorney, Agent, or Firm* — Nicholson DeVos Webster & Elliott LLP

(57) ABSTRACT

Techniques for using an autoencoder to detect anomalies are described. For example, a semi-supervised conditional Wasserstein autoencoder (CWAE) incorporates a limited amount of known normal and labeled anomalous events, and unlabeled data. These examples utilize a cluster assumption and consider the cluster centers on known normal events as representations of normal activities. The multi-cluster-based approach aims to generate similar anomaly scores on labeled normal data; whereas assigning higher scores to labeled attacks during the training.

20 Claims, 9 Drawing Sheets

(56) References Cited

OTHER PUBLICATIONS

Mikolov, Tomas et al., Efficient Estimation of Word Representations in Vector Space, arXiv:1301.3781v1 [cs.CL] (2013), 9 pgs., https://arxiv.org/pdf/1301.3781v1.pdf.
Nielsen, Frank and Sun, Ke, Guaranteed Bounds on Information-Theoretic Measures of Univariate Mixtures Using Piecewise Log-Sum-Exp Inequalities, Entropy (2016), 25 pgs., vol. 18/ No. 12, https://www.mdpi.com/1099-4300/18/12/442.
Ruff, Lukas et al., Deep Semi-Supervised Anomaly Detection, arXiv:1906.02694v1 [cs.LG] (2019), 22 pgs., https://arxiv.org/pdf/1906.02694v1.pdf.
Shen, Chunhua and Li Hanxi, On the Dual Formulation of Boosting Algorithms, arXiv:0901.3590v4 [cs.LG] (2009), 16 pgs., https://arxiv.org/pdf/0901.3590v4.pdf.

* cited by examiner

MULTI-CLUSTER BASED SEMI-SUPERVISED ANOMALY DETECTION

BACKGROUND

The recent advances in big data and cloud computing have tremendously increased the demand for economical and scalable cloud services in the business. As the number of businesses using cloud services increases, the security of the stored information becomes more and more crucial.

BRIEF DESCRIPTION OF DRAWINGS

Various embodiments in accordance with the present disclosure will be described with reference to the drawings, in which:

FIG. 5(A) shows four clusters and corresponding centroids.

DETAILED DESCRIPTION

The present disclosure relates to methods, apparatus, systems, and non-transitory computer-readable storage media for detecting anomalous behavior.

Detailed herein are embodiments of an anomaly detection service that monitors for malicious activities and implements one ore machine learning models to provide protection. In some prior approaches, a conditional Wasserstein autoencoder (CWAE) was used to detect anomalous activities. Even though CWAE shows a good performance, there are some cases in which the model may identify normal activities as being anomalous.

Adding labeled data information into an unsupervised CWAE improves the performance and robustness. Detailed herein are examples of a semi-supervised version of CWAE which incorporates a limited amount of known normal and labeled anomalous events, and unlabeled data. These examples utilize a cluster assumption and consider the cluster centers on known normal events as representations of normal activities. The multi-cluster-based approach aims to generate similar anomaly scores on labeled normal data; whereas assigning higher scores to labeled attacks during the training.

Figure 1:
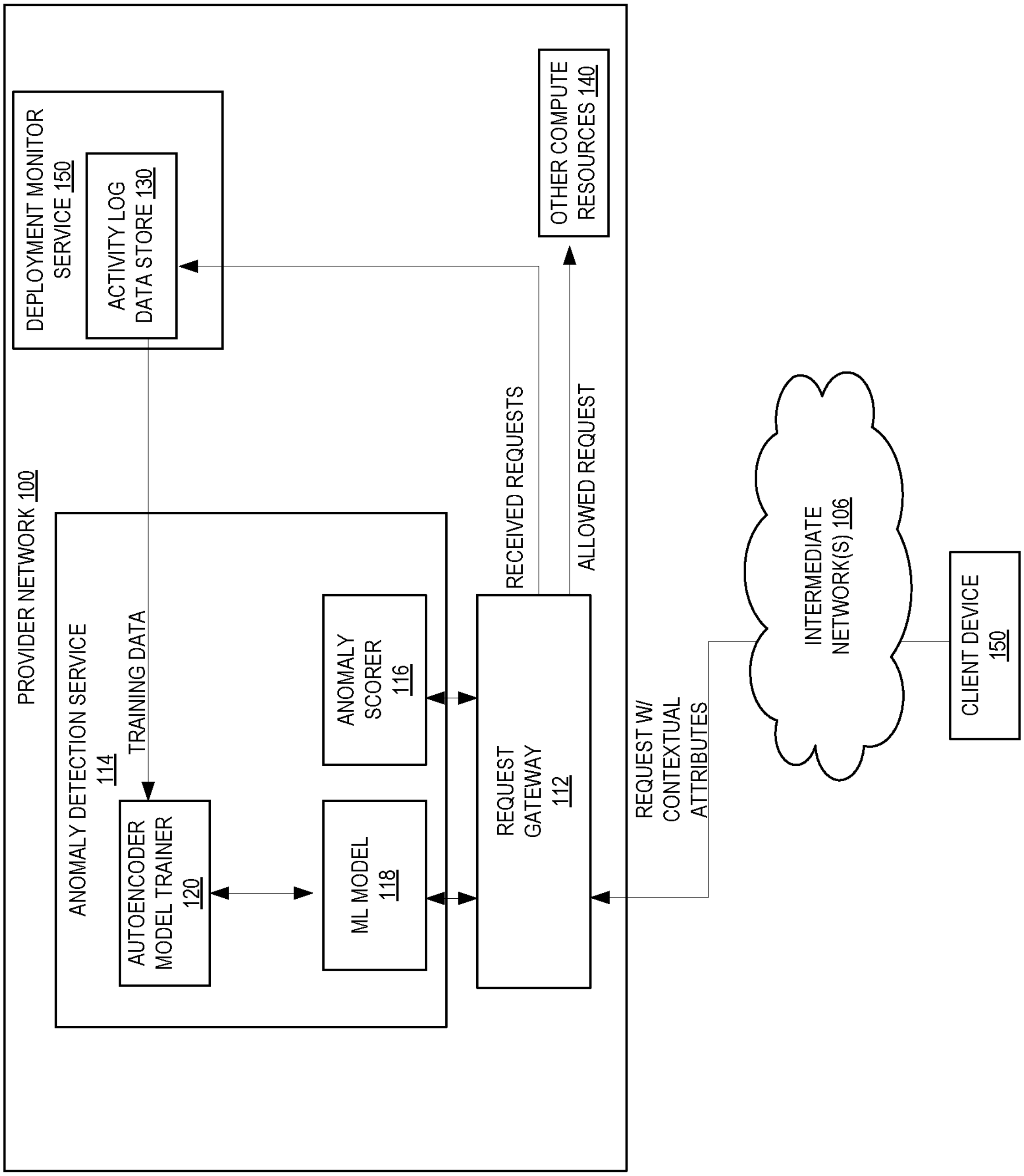
FIG. 1 illustrates an embodiments of a provider network in which an autoencoder ML model has been trained using historical activity data and deployed as a part of an anomaly detection service to determine whether requests to perform an action within the provider network are potentially anomalous events and process the requests based on the determination of whether the requests are potentially anomalous events.

FIG. 1 illustrates an embodiments of a provider network 100 in which an autoencoder ML model 118 has been trained using historical activity data and deployed as a part of an anomaly detection service 114 to determine whether requests to perform an action within the provider network 100 are potentially anomalous events and process the requests based on the determination of whether the requests are potentially anomalous events.

A request gateway 112 generally serves as a publicly facing system through which users request the performance of various actions within the provider network 100 (e.g., through the execution of one or more functions on computing resources 140 such as a model hosting service). Generally, a request gateway 112 receives requests from users of provider network 100. To evaluate those requests, or from a historical data log of activity within provider network 100 (that, in some embodiments, is maintained by a deployment monitor service 150), the anomaly detection service 114 calculates an anomaly score for each request based on an autoencoder ML model 118 that attempts to reconstruct the request from an encoding of the request, and an anomaly scorer 116 calculates anomaly score to determine whether an request is potentially anomalous. The request gateway 112 takes action to handle the request based on the determination of whether a request is potentially anomalous.

Request processor 112 generally receives incoming requests from client devices that instruct provider network 100 to perform one or more actions with respect to computing resources 140. As discussed, request gateway 112 may provide information about the incoming request (e.g., event attributes defining the properties of the requested event (also referred to herein as "request attributes") and contextual attributes defining information about the user that generated the request) to anomaly detection service 114 to obtain an anomaly score. When request processor 112 receives the anomaly score from anomaly detection service 114, request processor 112 can examine the anomaly score to determine whether the incoming request represents a potentially anomalous request for the user.

If request processor 112 determines that the incoming request is a non-anomalous request, request processor 112 can execute the action(s) identified in the incoming request against the computing resources 140 specified in the incoming request. For example, the actions may include authenticating a user, instantiating or terminating cloud computing instances, instantiating or deallocating dynamic storage systems for the user, changing routing information for the user, changing a geographic location at which cloud computing instances are instantiated, and other operations that may be performed to configure and operate cloud computing instances in a dynamically scalable computing environment.

If, however, request processor 112 determines that the incoming request is a potentially anomalous request, request processor 112 can take one or more actions to verify that the request is a legitimate request or determine that the request is, in fact, an anomalous request that should not be executed. In some embodiments, request processor 112 can use information about the user identified in the incoming request to obtain contact information for the user and push, to the user, a request to verify that the incoming request was generated by the user. For example, user information included in the incoming request (e.g., user account information, such as a username, an account identifier, etc.) may be used to find user contact information, such as a mobile phone number or e-mail address, in a user database. A notification (e.g., in the form of a short message service (SMS) or multimedia message service (MMS) message, an e-mail, a voice call, a push notification through an application installed on a user's computing device, etc.) may be generated to request that a user confirm that the incoming request is legitimate activity. If the user confirms that the incoming request is legitimate activity, request processor 112 can execute the action(s) identified in the incoming request against the computing resources 140 specified in the incoming request or otherwise unblock execution of the action(s) identified in the incoming request. Otherwise, if the user indicates that the incoming request corresponds to illegitimate activity or does not respond to the request, request processor 112 can drop the incoming request such that no action is performed against computing resources 140 in response to receipt of the incoming request.

Generally, request processor 112 may write information about the incoming requests received at request processor 112 to activity log data store 130 for use in re-training the anomaly detection model used by anomaly detection service 114 to determine whether incoming requests are potentially anomalous for a given user. In some embodiments, request processor 112 may write information about non-anomalous events to activity log data store 130 such that information about anomalous events may not be used to train the anomaly detection model. In some embodiments, user feedback about potentially anomalous events may be used to augment the historical user activity data stored in activity log data store 130 to improve the accuracy at which an anomaly detection model executed by anomaly detection service 114 determines whether incoming requests correspond to anomalous or non-anomalous activity. For example, if a user indicates that an incoming request flagged as potentially anomalous is, in fact, non-anomalous, information about the incoming request may be tagged with an indication that the incoming request corresponds to legitimate activity for the user. When the anomaly detection model 118 is re-trained (which may occur on-demand or periodically), the anomaly detection model may take into account activity marked as legitimate to generate one or more rules for identifying similar activity as non-anomalous activity in the future.

Generally, some number of anomalous events may be expected to occur for each user of computing resources 140 in provider network 100 during typical operations within the provider network 100. However, a spike or other abnormality in the number of anomalous events detected for a given user within a given time period may be indicative of illegitimate activity being generated by a user of provider network 100 (e.g., due to compromised credentials allowing other persons to impersonate a user, malware programmed to hijack a user's cloud computing instances, etc.). To determine whether the rate at which anomalous activity is generated for a user is within an expected amount for a given window of time, request gateway 112 may maintain a counter that tracks a number of potentially anomalous events generated by each user of the provider network 100 over the window of time. If the counter tracking events flagged as potentially anomalous by the request gateway 112 exceeds a threshold number of events over a time window, request gateway 112 may take one or more actions to verify that the user has not been compromised and, if so, take one or more actions to rectify any compromise of user credentials or otherwise attempt to reduce the occurrence of potentially anomalous activity generated by the user.

The anomaly detection service 114 generally is configured to calculate an anomaly score for each request to be analyzed using an ML model 118 trained by autoencoder trainer 120 using historical user activity from activity log data store 130, as discussed in further detail below. The anomaly score calculated for each request may, in some embodiments, be a conditional probability calculated based on a distance between a reconstructed version of the request to be analyzed and the request to be analyzed, and the anomaly score may represent a likelihood that the request to be analyzed falls is similar to the non-anomalous requests used to train an autoencoder.

To calculate an anomaly score for an incoming request, the anomaly scorer 116 generally receives information about a request from a request processor 112 or from historical requests stored in activity log data store 130. Each request may be defined as a set of event attributes and a set of contextual attributes. The set of event attributes may include, for example, information about the requested action, parameters for the requested action, the source system from which the request was received, and the like. In some embodiments, the information about the source system from which the request was received may include an Autonomous System Number (ASN) of the network from which the request was received. Because IP addresses may change over time, and because IP addresses may have large cardinality (e.g., 232 addresses in IPv4, 2128 addresses in IPv6), using a smaller universe of data such as ASNs, which have a maximum of 65,536 numbers in existence, may provide sufficient information about the source system from which the request was received while reducing the complexity of encoding the incoming request into a latent space representation and generating a reconstruction of the incoming request from the encoding in the latent space. The contextual attributes may include, for example, information about the request itself, such as information identifying the user that generated the request, an account associated with the user, timestamp data, and the like. Information identifying the contextual attributes to use in determining whether an event is anomalous or non-anomalous may be defined by a user according to contextual information found to have been relevant to determining whether evets correspond to anomalous or non-anomalous activity.

In some embodiments, the contextual information may be encoded into a compressed representation of the context information prior to encoding the incoming request into an encoding in the latent space of an autoencoder. The contextual information may be encoded using a neural network configured to compress a number of pieces of contextual information into an encoding representing the contextual information of the request. In some embodiments, the individual pieces of contextual information may be combined into a contextual information vector, and the contextual information vector may be encoded using a neural network. The ML model 118 may then generate a request vector representing the incoming request including information about the event to be invoked, the contextual information vector, and an identification of the system from which the incoming request was received.

In some embodiments, other anomaly detection techniques can be used as an alternative to or in conjunction with the autoencoder-based anomaly detection techniques discussed herein. For example, conditional noise contrastive estimation (NCE) models trained on a training data set of non-anomalous requests can be used to generate anomaly scores for each incoming request. NCE anomaly scores can be used alone or in conjunction with the anomaly scores generated by an autoencoder-based anomaly detector to determine whether an incoming request is potentially anomalous and process the incoming request.

The model trainer 120 is generally configured to train ML model 118 as a variant of a conditional Wasserstein autoencoder, or any other autoencoder that can reconstruct an approximation x' of an incoming request x and determine a likelihood that the incoming request x is similar to a universe of a priori known non-anomalous requests.

Activity log data store 130 generally provides a data repository in which historical information about user activity within computing environment may be stored for use in training an anomaly detection model. Activity log data store 130 may be structured, for example, as a relational database, a non-relational database, a flat file store including one or more files in which user activity information is stored, and the like. Generally, data stored in activity log data store 130 may include information about each request processed in the provider network 100. This information may include event information identifying the activity requested by a user and contextual information providing information about the request. This contextual information may include, for example, information about a location from which the request was generated and time at which the request was generated, username and account information, and other information that may be used in conjunction with the event information to train an anomaly detection model to generate conditional probabilities representing a likelihood that a particular user generated a request to perform a particular action at a given time and from a given location. Generally, activity log data store 130 may be periodically augmented to include information about activity generated by new users and additional activity generated by existing users so that the anomaly detection model may be retrained.

Computing resources 140 generally represent various cloud computing resources that users can execute requests against to obtain or release computing resources for use in performing a given task. These computing resources may include, for example, dynamically allocable virtual machines or other cloud computing instances, cold storage instances for storing data in a persistent manner, database services used by other cloud computing instances in provider network 100, machine learning system instances, request routers, load balancers, and other computing resources that may be dynamically assigned to serve various users within the cloud computing environment. Generally, request gateway 112 may execute requests against the computing resources 140 if, as discussed above, the requests are determined to correspond to non-anomalous activity or if a user indicates that potentially anomalous activity corresponds to legitimate, non-anomalous activity.

In some embodiments, the techniques described above may be used to monitor for potentially fraudulent activity by users of provider network 100. To determine whether a user is engaged in potentially fraudulent activity within provider network 100, the anomaly detection service 114 may receive a data set of historical requests generated by the user over a period of time. The data set may include a plurality of requests to perform actions within provider network 100, and information about each request may specify the requested action, the source device that generated the request to perform the requested action, and contextual information about each request (e.g., user ID information, account information user type information, and the like).

The anomaly detection service 114 may generate anomaly scores for each request in the plurality of requests and, in some embodiments, may calculate a distribution of the generated anomaly scores to determine whether the user is potentially engaged in fraudulent activity within provider network 100. For example, in calculating a distribution of the generated anomaly scores, request anomaly detector 112 can generate a histogram showing the frequency at which ranges of anomaly scores are calculated for requests in the data set. In some embodiments, it may be assumed that a user that is not potentially engaged in fraudulent activity may be associated predominantly with requests having high anomaly scores (e.g., requests that are likely to represent expected action for the user within the provider network 100), while a user that is potentially engaged in fraudulent activity may have a bimodal distribution of probability scores (e.g., a large number of requests having low anomaly scores and a large number of requests having high anomaly scores), or a distribution skewed towards requests having low anomaly scores. In another example, request anomaly detector can identify the number of requests in the data set having anomaly scores less than a threshold score defined for potentially anomalous events. If the number of potentially anomalous events exceeds a threshold value (e.g., an absolute number of potentially anomalous events or a percentage of the requests associated with the user for a given time period), request anomaly detector can determine that the user is potentially engaged in fraudulent activity.

When anomaly detection service 114 determines that a user is potentially engaged in fraudulent activity, anomaly detection service 114 can take various actions to prevent the user from generating additional activity within provider network 100. For example, login credentials for the user may be changed to prevent the user from logging into provider network 100 using previously valid login credentials or authenticating requests to perform actions in provider network 100 at request gateway 112. In another example, request gateway 112 may be configured to drop received requests associated with the user or queue such requests for execution after user confirmation that the requests are legitimate requests to perform actions within provider network 100 (e.g., were not generated by someone pretending to be the user).

The requests may each include categorical data that the model trainer can use, individually and in combination, to train a model to estimate conditional probabilities for each attribute of a request. For example, the information may include attributes of each request, such as an API call invoked by a request, a computing resource targeted by the API call, the system or network that generated the request and the like, as well as contextual information about requests received, such as user identification, user type information, account information (e.g., an account identifier), and other information that may provide context about requests generated by users of the provider network 100.

The provider network 100 (or, "cloud" provider network) provides users with the ability to use one or more of a variety of types of computing-related resources such as compute resources (e.g., executing virtual machine (VM) instances and/or containers, executing batch jobs, executing code without provisioning servers), data/storage resources (e.g., object storage, block-level storage, data archival storage, databases and database tables, etc.), network-related resources (e.g., configuring virtual networks including groups of compute resources, content delivery networks (CDNs), Domain Name Service (DNS)), application resources (e.g., databases, application build/deployment services), access policies or roles, identity policies or roles, machine images, routers and other data processing resources, etc. These and other computing resources can be provided as services, such as a hardware virtualization service that can execute compute instances, a storage service that can store data objects, etc. The users (or "customers") of provider networks 100 can use one or more user accounts that are associated with a customer account, though these terms can be used somewhat interchangeably depending upon the context of use. Users can interact with a provider network 100 across one or more intermediate networks 106 (e.g., the internet) via one or more interface(s), such as through use of application programming interface (API) calls, via a console implemented as a website or application, etc. An API refers to an interface and/or communication protocol between a client and a server, such that if the client makes a request in a predefined format, the client should receive a response in a specific format or initiate a defined action. In the cloud provider network context, APIs provide a gateway for customers to access cloud infrastructure by allowing customers to obtain data from or cause actions within the cloud provider network, enabling the development of applications that interact with resources and services hosted in the cloud provider network. APIs can also enable different services of the cloud provider network to exchange data with one another. The interface(s) can be part of, or serve as a front-end to, a control plane of the provider network 100 that includes "backend" services supporting and enabling the services that can be more directly offered to customers.

For example, a cloud provider network (or just "cloud") typically refers to a large pool of accessible virtualized computing resources (such as compute, storage, and networking resources, applications, and services). A cloud can provide convenient, on-demand network access to a shared pool of configurable computing resources that can be programmatically provisioned and released in response to customer commands. These resources can be dynamically provisioned and reconfigured to adjust to variable load. Cloud computing can thus be considered as both the applications delivered as services over a publicly accessible network (e.g., the Internet, a cellular communication network) and the hardware and software in cloud provider data centers that provide those services.

A cloud provider network can be formed as a number of regions, where a region is a geographical area in which the cloud provider clusters data centers. Each region includes multiple (e.g., two or more) availability zones (AZs) connected to one another via a private high-speed network, for example a fiber communication connection. An AZ (also known as a "zone") provides an isolated failure domain including one or more data center facilities with separate power, separate networking, and separate cooling from those in another AZ. A data center refers to a physical building or enclosure that houses and provides power and cooling to servers of the cloud provider network. Preferably, AZs within a region are positioned far enough away from one another so that a natural disaster (or other failure-inducing event) should not affect or take more than one AZ offline at the same time.

Users can connect to an AZ of the cloud provider network via a publicly accessible network (e.g., the Internet, a cellular communication network), e.g., by way of a transit center (TC). TCs are the primary backbone locations linking users to the cloud provider network and can be collocated at other network provider facilities (e.g., Internet service providers (ISPs), telecommunications providers) and securely connected (e.g., via a VPN or direct connection) to the AZs. Each region can operate two or more TCs for redundancy. Regions are connected to a global network which includes private networking infrastructure (e.g., fiber connections controlled by the cloud provider) connecting each region to at least one other region. The cloud provider network can deliver content from points of presence (or "POPs") outside of, but networked with, these regions by way of edge locations and regional edge cache servers. This compartmentalization and geographic distribution of computing hardware enables the cloud provider network to provide low-latency resource access to users on a global scale with a high degree of fault tolerance and stability.

To provide these and other computing resource services, provider networks 100 often rely upon virtualization techniques. For example, virtualization technologies can provide users the ability to control or use compute resources (e.g., a "compute instance," such as a VM using a guest operating system (O/S) that operates using a hypervisor that might or might not further operate on top of an underlying host O/S, a container that might or might not operate in a VM, a compute instance that can execute on "bare metal" hardware without an underlying hypervisor), where one or multiple compute resources can be implemented using a single electronic device. Thus, a user can directly use a compute resource (e.g., provided by a hardware virtualization service) hosted by the provider network to perform a variety of computing tasks. Additionally, or alternatively, a user can indirectly use a compute resource by submitting code to be executed by the provider network (e.g., via an on-demand code execution service), which in turn uses one or more compute resources to execute the code-typically without the user having any control of or knowledge of the underlying compute instance(s) involved.

For example, in various embodiments, a "serverless" function can include code provided by a user or other entity—such as the provider network itself—that can be executed on demand. Serverless functions can be maintained within a provider network by an on-demand code execution service and can be associated with a particular user or account, or can be generally accessible to multiple users/accounts. A serverless function can be associated with a Uniform Resource Locator (URL), Uniform Resource Identifier (URI), or other reference, which can be used to invoke the serverless function. A serverless function can be executed by a compute resource, such as a virtual machine, container, etc., when triggered or invoked. In some embodiments, a serverless function can be invoked through an application programming interface (API) call or a specially formatted HyperText Transport Protocol (HTTP) request message. Accordingly, users can define serverless functions that can be executed on demand, without requiring the user to maintain dedicated infrastructure to execute the serverless function. Instead, the serverless functions can be executed on demand using resources maintained by the provider network 100. In some embodiments, these resources can be maintained in a "ready" state (e.g., having a pre-initialized runtime environment configured to execute the serverless functions), allowing the serverless functions to be executed in near real-time.

Figure 2:
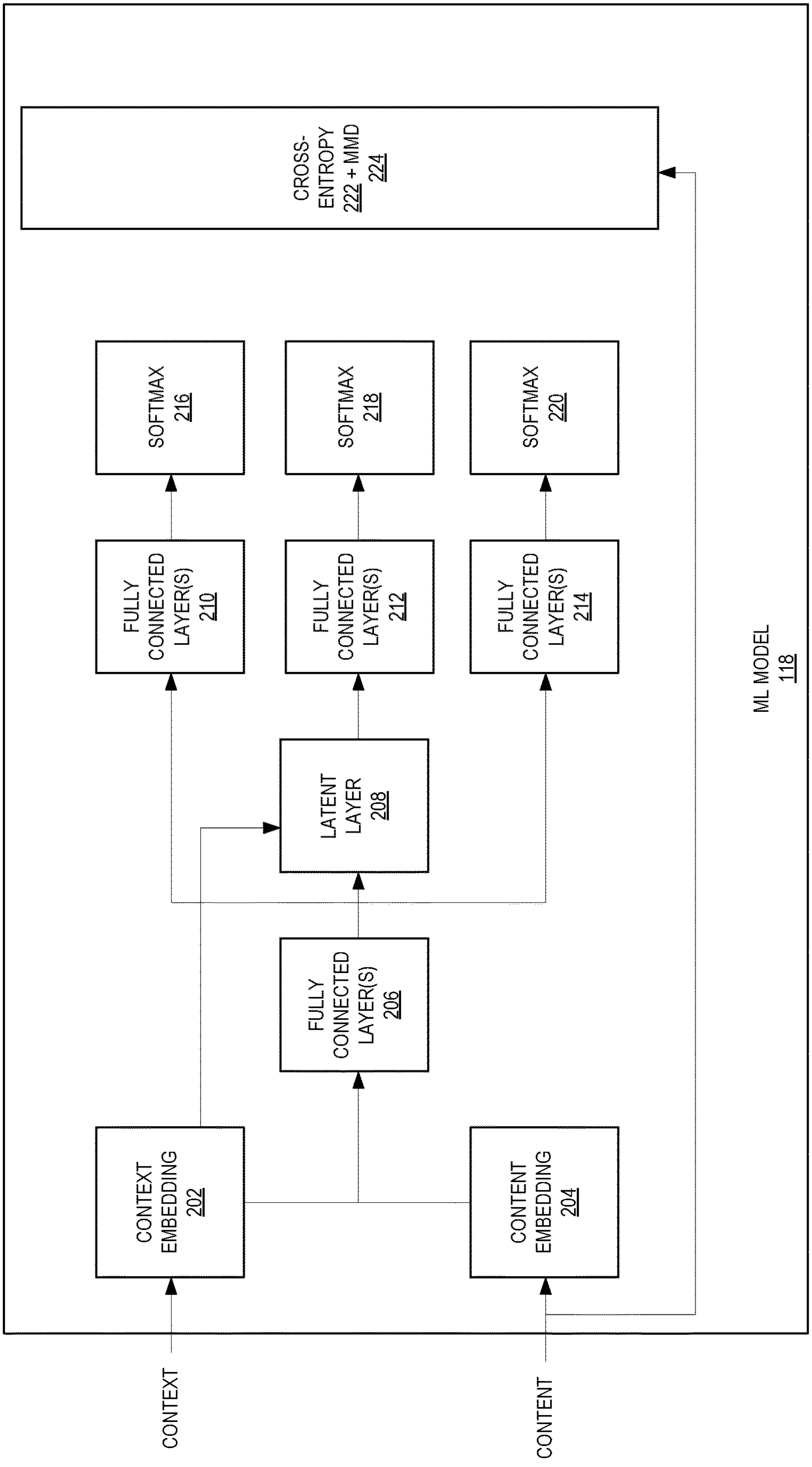
FIG. 2 illustrates embodiments of a ML model used to detect potential anomalous behavior.

FIG. 2 illustrates embodiments of a ML model used to detect potential anomalous behavior. In some embodiments, the ML model is a conditional Wasserstein Autoencoder with a pre-trained embedding (PT-CWAE) which is an unsupervised anomaly detector. As shown, the ML model 118 evaluates an event having content and context. Typically, the content and context are in the form of feature comprising a multi-element tuple. For example, in some embodiments, the context comprises a UserType, accountID, username, and bucketName and the content comprises an eventName, ASNorg, and UserAgent. As such, there is a context feature tuple, a content feature tuple, and an overall event tuple of context feature, content feature. Note that these features are exemplary to show how the ML model works, but different or additional features may be used.

In some embodiments, pre-trained embedding layers are used for the features userName and bucketName. These features have many similar text variants in our dataset that have a common text structure. These pre-trained embedding layers provide the model with an innate ability to understand text similarity which will reduce the false positives otherwise caused by novel instances that are similar to those seen in the training set. In some embodiments, the pre-trained embedding layers are a Word2Vec model.

A context embedding 202 is applied to the context and content embedding 204 is applied to the content. When the pre-trained embedding is used, those features are not subjected to the embeddings 202 and 204.

The output of the embeddings 202 and 204 is fed to one or more fully connected (FC) layers 206 forming an encoder. In some embodiments, subsequent FC layers get smaller.

The output of the encoder is fed to a latent layer 206.

The latent layer 206 feeds a decoder comprising a plurality of FC layers 210, 212, and 214 and corresponding softmax functions 216, 218, and 220. In some embodiments, the FC layers and softmax functions correspond to the context features.

The model minimizes a cost function of cross entropy loss 222 between the predicted softmax values and the true values of the content feature, and regulizer (such as a maximum mean discrepancy (MMD)) 222 used to penalize the encoded latent space distribution that does not match a prior distribution.

As such, this model first encodes the concatenation of the embedding vectors of contextFeature and contentFeature, and then reconstructs each contentFeature through a separated decoder. Unfortunately, while PT-CWAE is an improvement over prior approaches, it can suffer from too many false positives.

Figure 3:
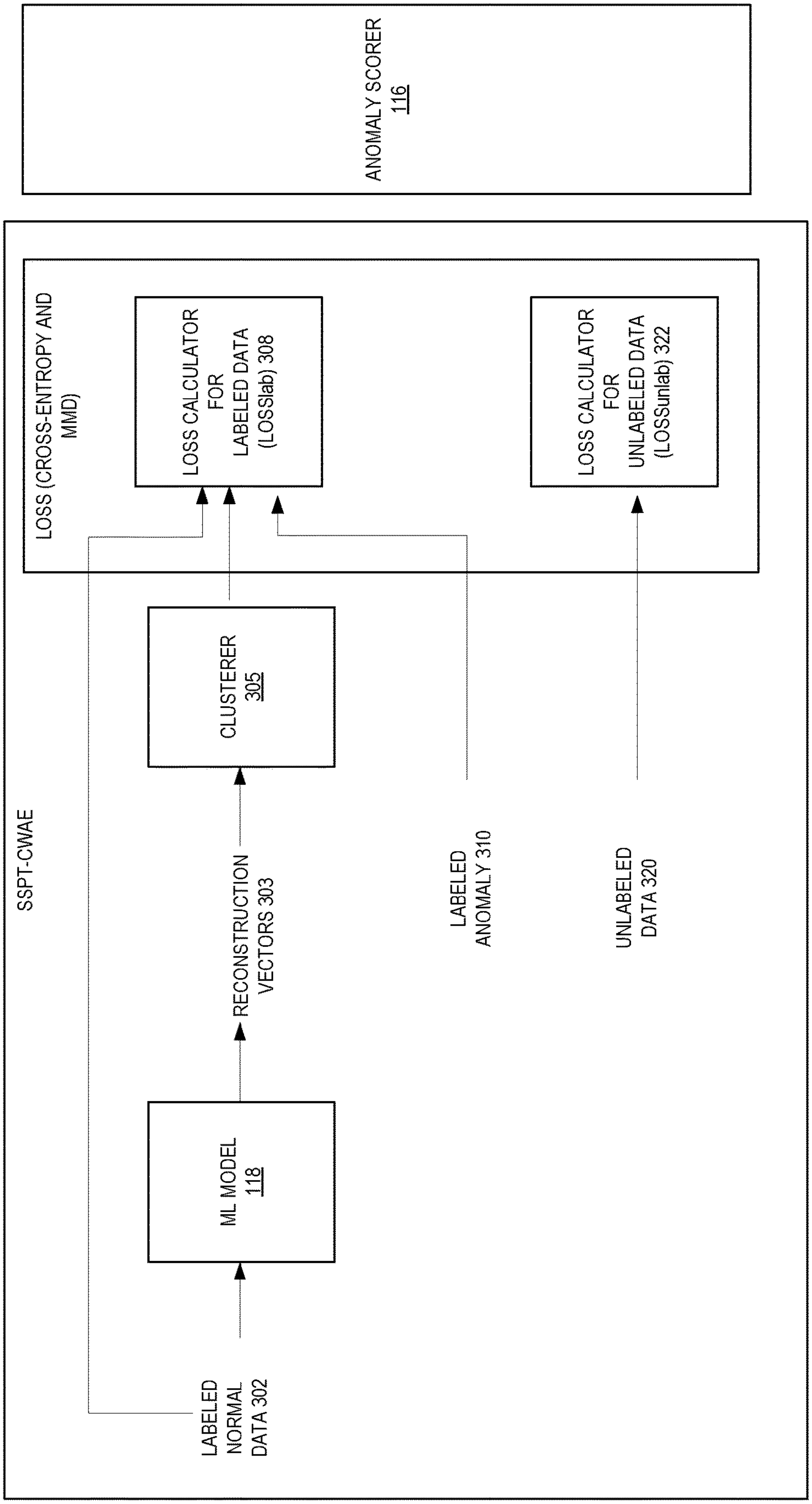
FIG. 3 illustrates embodiments of a semi-supervised PT-CWAE (SSPT-CWAE) model.

FIG. 3 illustrates embodiments of a semi-supervised PT-CWAE (SSPT-CWAE) model. SSPT-CWAE is based on the cluster assumption on normal data. Particularly, it is assumed that there exists an underlying distribution for normal events; so that the reconstruction vectors (and anomaly scores) of normal events cluster around one or more centroids.

In some embodiments, there is a large pool of "normal" events, and a small number of anomalous events can be labeled. The unsupervised setting of a CWAE model (as in FIG. 2) assumes that the training data is normal; hence does not utilize any information about these known events. The events that the model can successfully reconstruct (i.e., a small reconstruction loss) are assumed to be normal and the ones having high reconstruction cost are labeled as anomaly. SSPT-CWAE, on the other hand, incorporates these labeled normal events and attacks. In addition to minimizing reconstruction loss on unlabeled data, it also tries to keep anomaly score small on labeled normal events and makes it as large as possible on labeled attacks during training.

Figure 4:
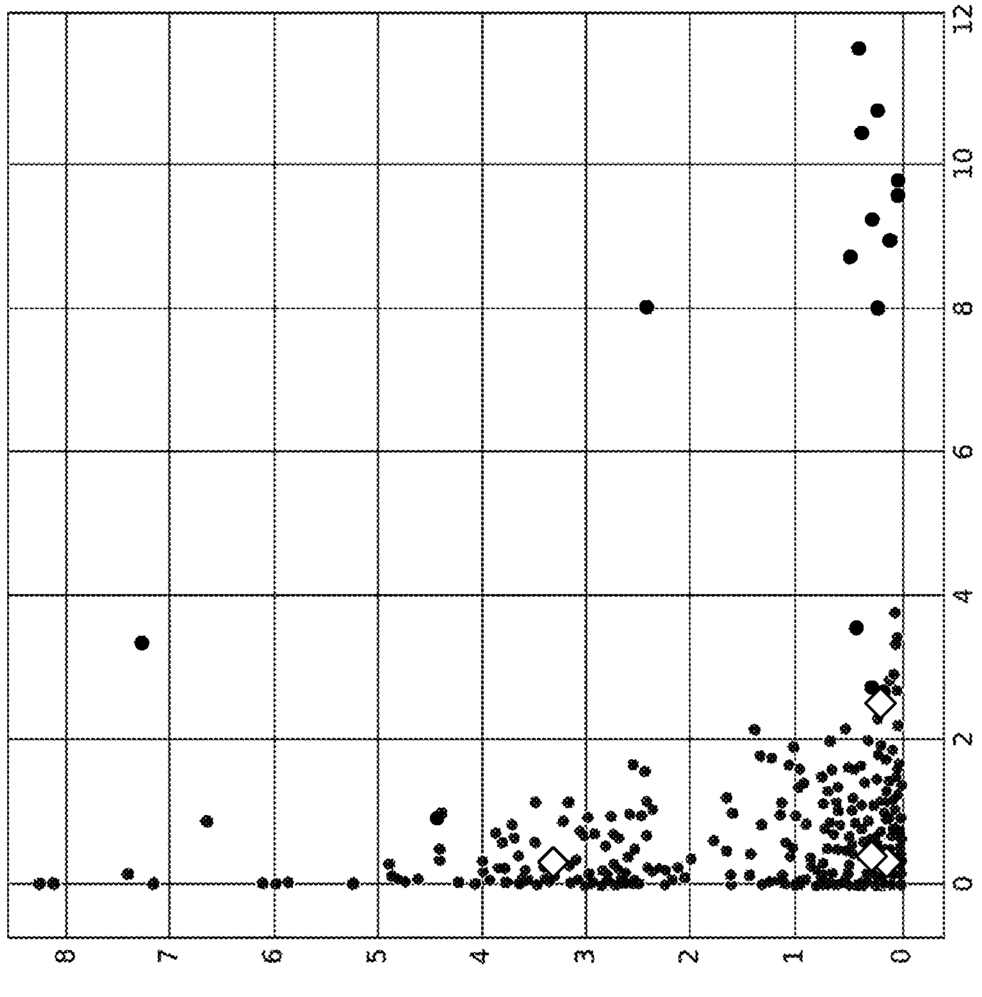
FIG. 4 illustrates exemplary reconstruction losses computed on a portion of events.

In some embodiments, the SSPT-CWAE model makes a perfect classification only when the maximum anomaly score on normal data is smaller than the minimum score on anomalies. FIG. 4 illustrates exemplary reconstruction losses computed on a portion of events. The circles represent the distribution of reconstruction vectors calculated on labeled normal events using PT-CWAE. It can be seen that even though most of the data clusters around an origin, there exist some events for which ReconLoss(ASNOrg) clusters around four centers (illustrated as diamonds). This requires the reconstruction loss of all of the content components to be close to zero on normal events. A 3D reconstruction vector (RV) for event (E) allows the model to take each dimension into account separately:

$$RV(E) = \left[ReconLoss(cnt_1),\ ReconLoss(cnt_2),\ ReconLoss(cnt_3)\right)^T$$

A maximum anomaly score-based classification assumes that the training data is normal and hence the maximum anomaly score represents the worst-case scenario on normal events. If any event has a higher anomaly score than this value, it is classified as an outlier. Even though this classification scheme performs well in practice, it lacks the statistical interpretation which is the anomalies are rare events on the normal data. As such, in some embodiments, the anomaly core follows a gamma distribution and a probability of observing an event can be computed by fitting a gamma distribution to anomaly scores of training data. Notice that this approach gives the desired meaning to anomalies: the event's E probability to be observed is below a significance level.

A goal of SSPT-CWAE is to generate the reconstruction vectors on unlabeled events while keeping anomaly score of labeled normal data small and scores of the labeled attacks as large as possible. This goal can be achieved by adapting following penalty on labeled event data E:

$$\text{Penalty} = \begin{cases} \min_i \|RV(E) - C_i\|_2^2 & \text{if } E \text{ is normal,} \\ \dfrac{1}{\min_i \|RV(E) - C_i\|_2^2} & \text{if } E \text{ is attack.} \end{cases}$$

One drawback of the penalty is that it is non-smooth on both normal and outlier event and hence cannot be used as a loss in SSPT-CWAE. Notice that for any set of numbers $$\{x_i\}_{i=1}^l$$

the following inequality holds $$\max_i\{x_i\} \le \log\sum_{i=1}^{l}\exp\{x_i\} \le \log l + \max_i\{x_i\}.$$

The function log $$\sum\nolimits_{i=1}^{j} \exp\{x_i\}$$

is known as logarithm or sum of exponential (LSE). The Penalty function can be approximated as follows using LSE:

$$LSE_N(E;\ C,\ \theta_1) := -\frac{1}{\theta_1}\log\sum\nolimits_i \exp\{-\theta_1\|RV(E) - C_i\|_2^2\} \approx \min_i\|RV(E) - C_i\|_2^2 \qquad (1)$$

$$LSE_A(E; C, \theta_2) := -\frac{1}{\theta_2}\log\sum_i \exp\{-\theta_2\|RV(E) - C_i\|_2^{-2}\} \approx \frac{1}{\min_i\|RV(E) - C_i\|_2^2}, \tag{2}$$

where C is the matrix whose i-th column is $C_i$ and $LSE_N$ is the LSE for labeled normal and $LSE_A$ is the LSE for labeled anomaly.

The loss function of SSPT-CWAE is as follows:

$$\text{Loss} = \sum_{E\in D_U} TRL(E) + \lambda MMD + \eta_1\sum_{E\in D_N} LSE_N(E; C, \theta_1) + \eta_2\sum_{E\in D_A} LSE_A(E; C, \theta_2),$$

where $D_U$, $D_N$ and $D_A$ denote the sets of unlabeled, labeled normal, and anomalous events respectively. Parameters $\theta_1$ and $\theta_2$ are to be tuned for the best performance. TRL(E) is the total reconstruction loss.

Reconstruction vectors assigned by SSPT-CWAE to normal labeled events should be close to these cluster centers. As such, the anomaly score for each event under this approach is:

$$AS_{sspt}(E) = \min_{i=1}^{K}\|RV(E) - C_i\|_2$$

where $C_i$'s are the cluster centroids calculated on reconstruction vectors of normal data. Notice that this definition considers the distance to closest centroid in classification.

Figure 5B:
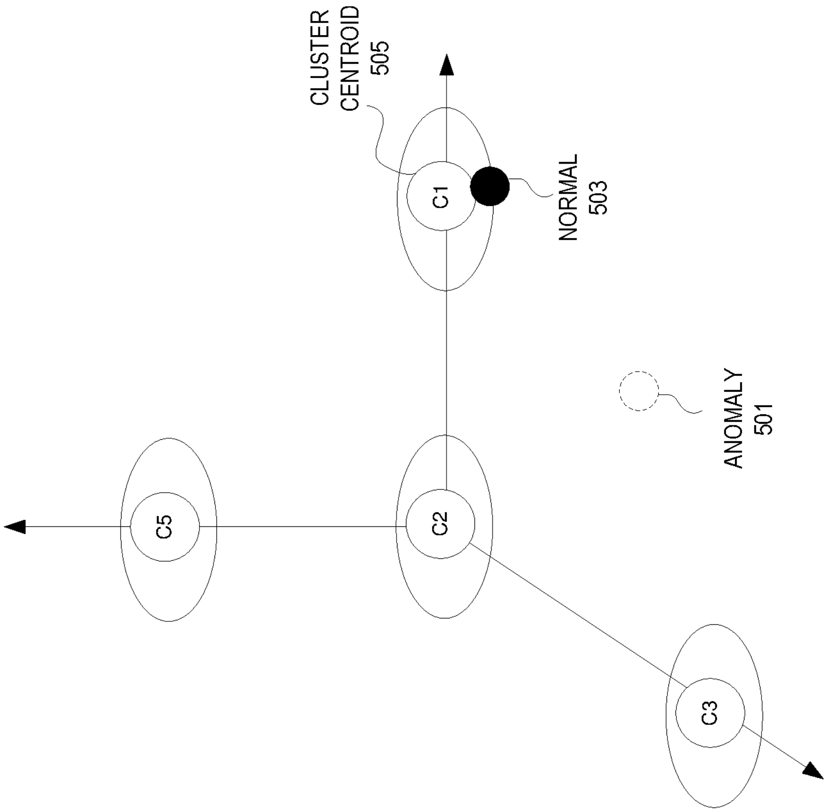
FIGS. 5(A)-(B) illustrate an exemplary clustering that uses the penalty.
Figure 5A:
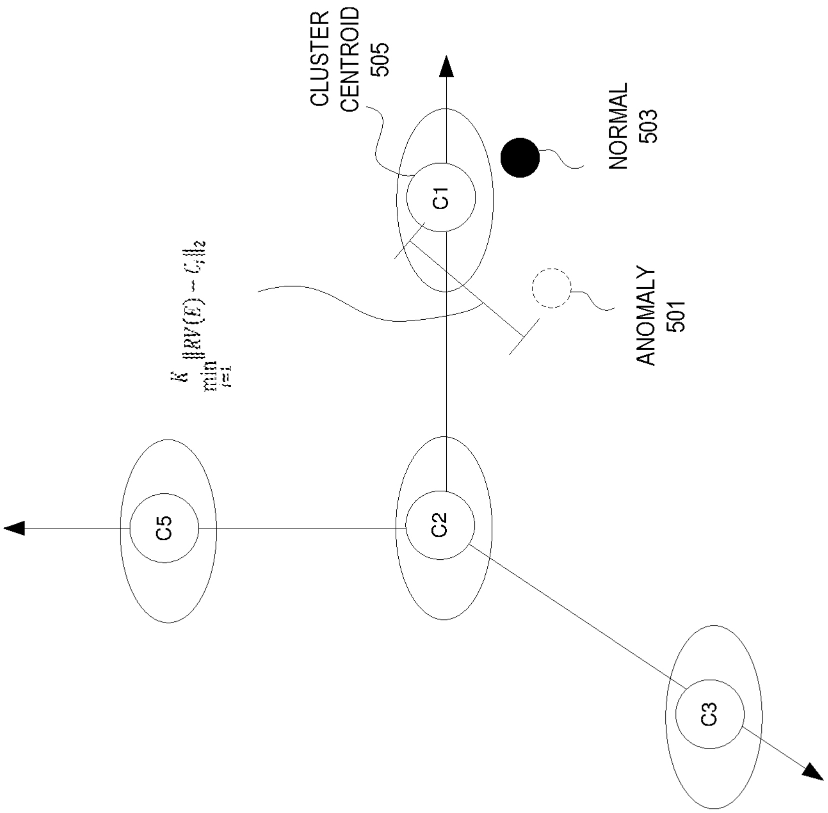

FIGS. 5(A)-(B) illustrate an exemplary clustering that uses the penalty. FIG. 5(A) shows four clusters and corresponding centroids. In this example, an anomalous event 501 is relatively close to the centroid 504 as is a normal 503 event. FIG. 5(B) shows the same four clusters and corresponding centroids. In this example, an anomalous event 501 is moved away from the to the centroid 504 and the normal 503 event moved into the cluster by applying the penalty.

Turning to FIG. 3, in practice the labeled normal data (that is fed into ML model 118), the output of which is reconstructed in, during training SSPT-CWAE receives the labeled normal data 302 and trains the ML model 118 to produce reconstruction vectors $\{RV_0(E)\}_{E\in D_N}$ 303. The reconstruction vectors 303 are then fed to a clusterer 305 (such as a K-Means clusterer) which calculates the cluster centers $\{C_i\}$ of $\{RV_0(E)\}_{E\in D_N}$ which define the $LSE_N$ and $LSE_A$ functions used by the loss calculator for labeled data 308 (note this also takes into account labeled anomaly data 310. and 322

The loss is minimized to generate reconstruction vectors $\{RV(E)\}_{E\in D}$ on training data $D=D_U\cup D_N\cup D_A$. Lastly, it estimates the CDF of gamma distribution, $f_{\alpha,\beta}(x)$, using the distribution of anomaly scores of training data. Any event E on testing data is classified as anomaly if the probability $1-f_{\alpha,\beta}(ASsspt(E))$ is below the classification threshold (e.g., $10^{-5}$) and normal otherwise.

Figure 6:
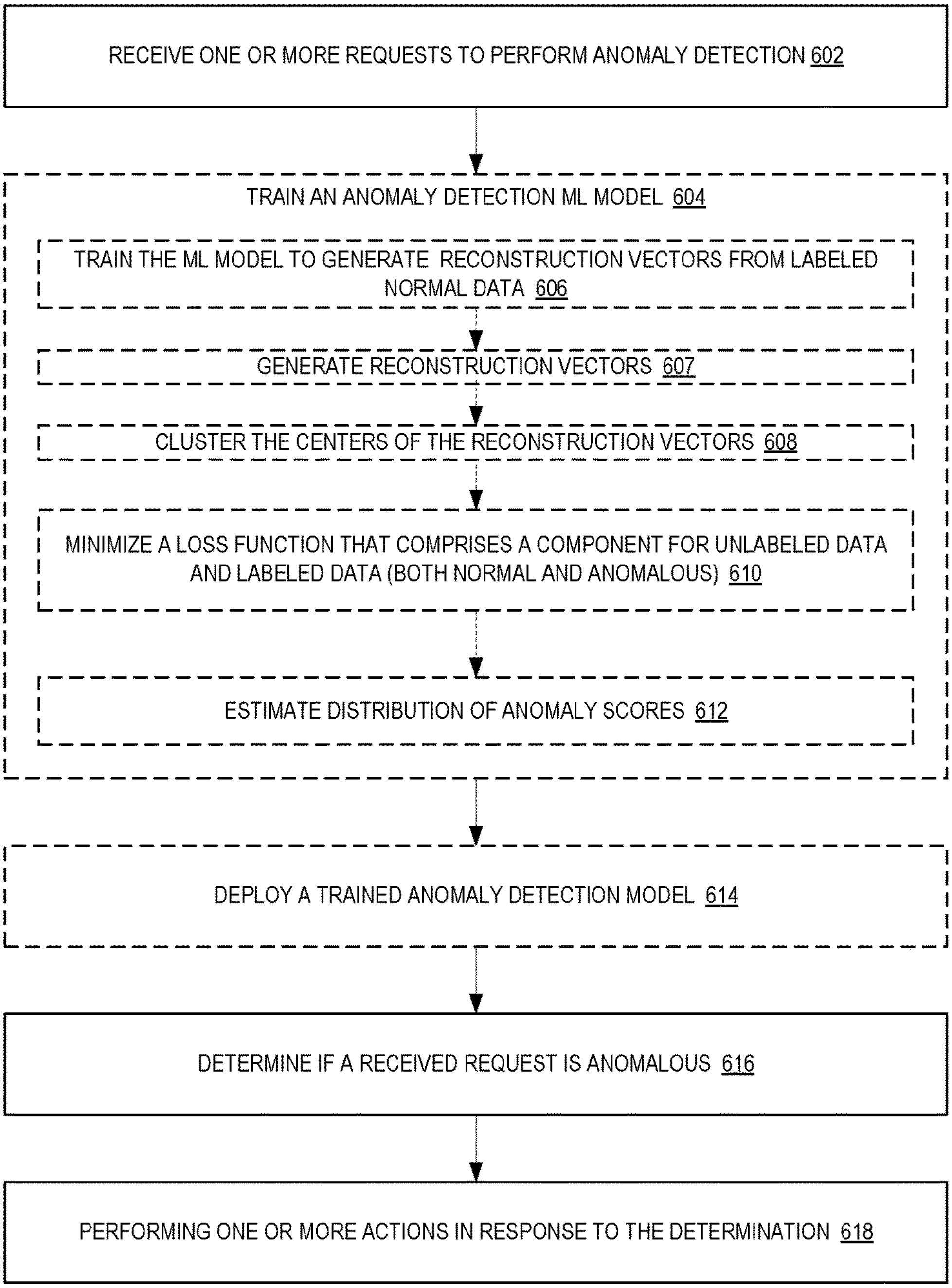
FIG. 6 is a flow diagram illustrating operations of a method for detecting anomalies according to some embodiments.

FIG. 6 is a flow diagram illustrating operations of a method for detecting anomalies according to some embodiments. Some or all of the operations (or other processes described herein, or variations, and/or combinations thereof) are performed under the control of one or more computer systems configured with executable instructions, and are implemented as code (e.g., executable instructions, one or more computer programs, or one or more applications) executing collectively on one or more processors. The code is stored on a computer-readable storage medium, for example, in the form of a computer program comprising instructions executable by one or more processors. The computer-readable storage medium is non-transitory. In some embodiments, one or more (or all) of the operations are performed by the anomaly detection service 114 of the other figures.

At 602 receive one or more requests to perform anomaly detection are received. The content of the one or more requests may include one or more of the following: information to identify content and context features to use for training (such as labeled normal, labeled anomalous, and unlabeled data) and/or inference, an indication of a threshold to use for an anomaly score, an indication of what clustering algorithm to use, an indication of what action(s) to take upon a detected anomaly, etc.

At 604 an anomaly detection ML model is trained in some embodiments. The training may comprise several acts. The ML model is trained to generate reconstruction vectors from labeled normal data at 606 if needed. Reconstruction vectors are then generated from the labeled training data at 607.

The centers of the reconstruction vectors are clustered at 608. In some embodiments, this is performed via k-means.

A loss function is minimized to generate reconstruction vectors using a loss function that comprises a component for unlabeled data and labeled data (both normal and anomalous) at 610. A distribution of anomaly scores is estimated at 612.

A trained anomaly detection model is deployed at 614.

A determination of if a received request is anomalous is made at 616. To make the determination, the request is fed to the ML model and reconstruction vectors and clusters are generated. An anomaly score is generated from those values. Any event E on testing data is classified as anomaly if the probability $1-f_{\alpha,\beta}(ASsspt(E))$ is below the classification threshold and normal otherwise. Note the threshold is based on the distribution. Generally, each request may include a plurality of request attributes and a plurality of contextual attributes. The request attributes may include at least information identifying the action to be performed and an identification of the source system (or network) from which the request was received. Other request attributes that may be included in a request may include, without limitation, an identification of the target computing resources against which the request is to be performed (e.g., a cluster of computing resources located at a particular geographic location), and other information defining an action to be performed against the target computing resources. For example, in a request to spawn a cloud computing instance, the request may include information identifying the cluster in which the cloud computing resources are to be generated, the amount of computing resources to allocate to the cloud computing instance (e.g., a number of processors, amount of memory, network interfaces, virtualizable I/O devices, etc.), and the like. The request may further include, explicitly or implicitly, contextual information that may be used by a scoring model to determine whether a request corresponds to non-anomalous (legitimate) activity or potentially anomalous activity. These contextual attributes may include, without limitation, information about the user initiating the request, account privileges, user type information, a location from which the request was received, a timestamp indicating when the request was received, and additional contextual information that may be predictive of whether a received request corresponds to anomalous or non-anomalous activity.

One or more actions are performed in response to the determination in some embodiments at 618. This may come in the form of one or more of: alerting that there was an anomaly, generating an incidence report when there was an anomaly, forwarding the request to be handled when there is no anomaly, etc.

Figure 7:
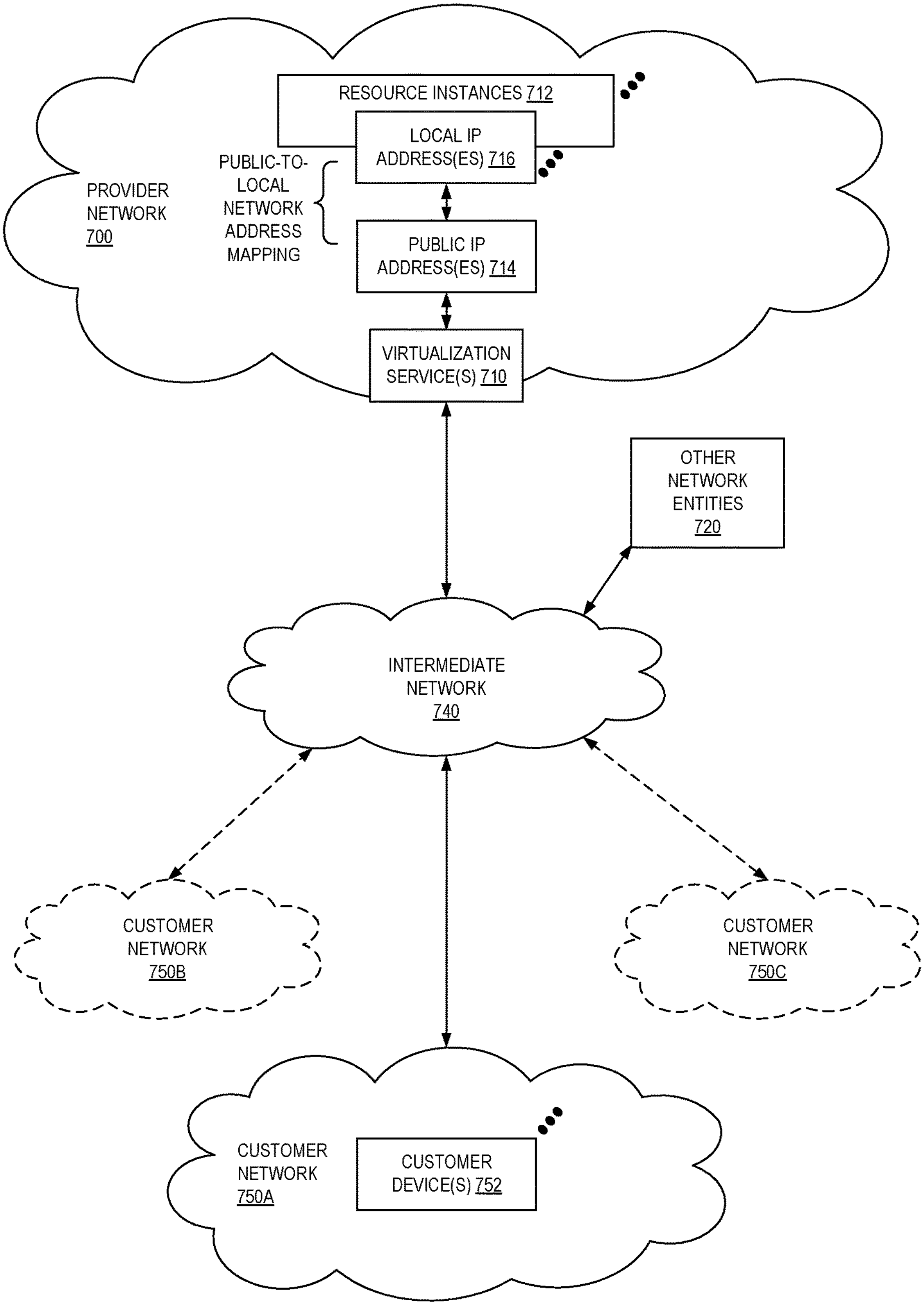
FIG. 7 illustrates an example provider network environment according to some embodiments.

FIG. 7 illustrates an example provider network (or "service provider system") environment according to some embodiments. A provider network 700 can provide resource virtualization to customers via one or more virtualization services 710 that allow customers to purchase, rent, or otherwise obtain instances 712 of virtualized resources, including but not limited to computation and storage resources, implemented on devices within the provider network or networks in one or more data centers. Local Internet Protocol (IP) addresses 716 can be associated with the resource instances 712; the local IP addresses are the internal network addresses of the resource instances 712 on the provider network 700. In some embodiments, the provider network 700 can also provide public IP addresses 714 and/or public IP address ranges (e.g., Internet Protocol version 4 (IPv4) or Internet Protocol version 6 (IPv6) addresses) that customers can obtain from the provider 700.

Conventionally, the provider network 700, via the virtualization services 710, can allow a customer of the service provider (e.g., a customer that operates one or more customer networks 750A-750C (or "client networks") including one or more customer device(s) 752) to dynamically associate at least some public IP addresses 714 assigned or allocated to the customer with particular resource instances 712 assigned to the customer. The provider network 700 can also allow the customer to remap a public IP address 714, previously mapped to one virtualized computing resource instance 712 allocated to the customer, to another virtualized computing resource instance 712 that is also allocated to the customer. Using the virtualized computing resource instances 712 and public IP addresses 714 provided by the service provider, a customer of the service provider such as the operator of the customer network(s) 750A-750C can, for example, implement customer-specific applications and present the customer's applications on an intermediate network 740, such as the Internet. Other network entities 720 on the intermediate network 740 can then generate traffic to a destination public IP address 714 published by the customer network(s) 750A-750C; the traffic is routed to the service provider data center, and at the data center is routed, via a network substrate, to the local IP address 716 of the virtualized computing resource instance 712 currently mapped to the destination public IP address 714. Similarly, response traffic from the virtualized computing resource instance 712 can be routed via the network substrate back onto the intermediate network 740 to the source entity 720.

Local IP addresses, as used herein, refer to the internal or "private" network addresses, for example, of resource instances in a provider network. Local IP addresses can be within address blocks reserved by Internet Engineering Task Force (IETF) Request for Comments (RFC) 1918 and/or of an address format specified by IETF RFC 4193 and can be mutable within the provider network. Network traffic originating outside the provider network is not directly routed to local IP addresses; instead, the traffic uses public IP addresses that are mapped to the local IP addresses of the resource instances. The provider network can include networking devices or appliances that provide network address translation (NAT) or similar functionality to perform the mapping from public IP addresses to local IP addresses and vice versa.

Public IP addresses are Internet mutable network addresses that are assigned to resource instances, either by the service provider or by the customer. Traffic routed to a public IP address is translated, for example via 1:1 NAT, and forwarded to the respective local IP address of a resource instance.

Some public IP addresses can be assigned by the provider network infrastructure to particular resource instances; these public IP addresses can be referred to as standard public IP addresses, or simply standard IP addresses. In some embodiments, the mapping of a standard IP address to a local IP address of a resource instance is the default launch configuration for all resource instance types.

At least some public IP addresses can be allocated to or obtained by customers of the provider network 700; a customer can then assign their allocated public IP addresses to particular resource instances allocated to the customer. These public IP addresses can be referred to as customer public IP addresses, or simply customer IP addresses. Instead of being assigned by the provider network 700 to resource instances as in the case of standard IP addresses, customer IP addresses can be assigned to resource instances by the customers, for example via an API provided by the service provider. Unlike standard IP addresses, customer IP addresses are allocated to customer accounts and can be remapped to other resource instances by the respective customers as necessary or desired. A customer IP address is associated with a customer's account, not a particular resource instance, and the customer controls that IP address until the customer chooses to release it. Unlike conventional static IP addresses, customer IP addresses allow the customer to mask resource instance or availability zone failures by remapping the customer's public IP addresses to any resource instance associated with the customer's account. The customer IP addresses, for example, enable a customer to engineer around problems with the customer's resource instances or software by remapping customer IP addresses to replacement resource instances.

Figure 8:
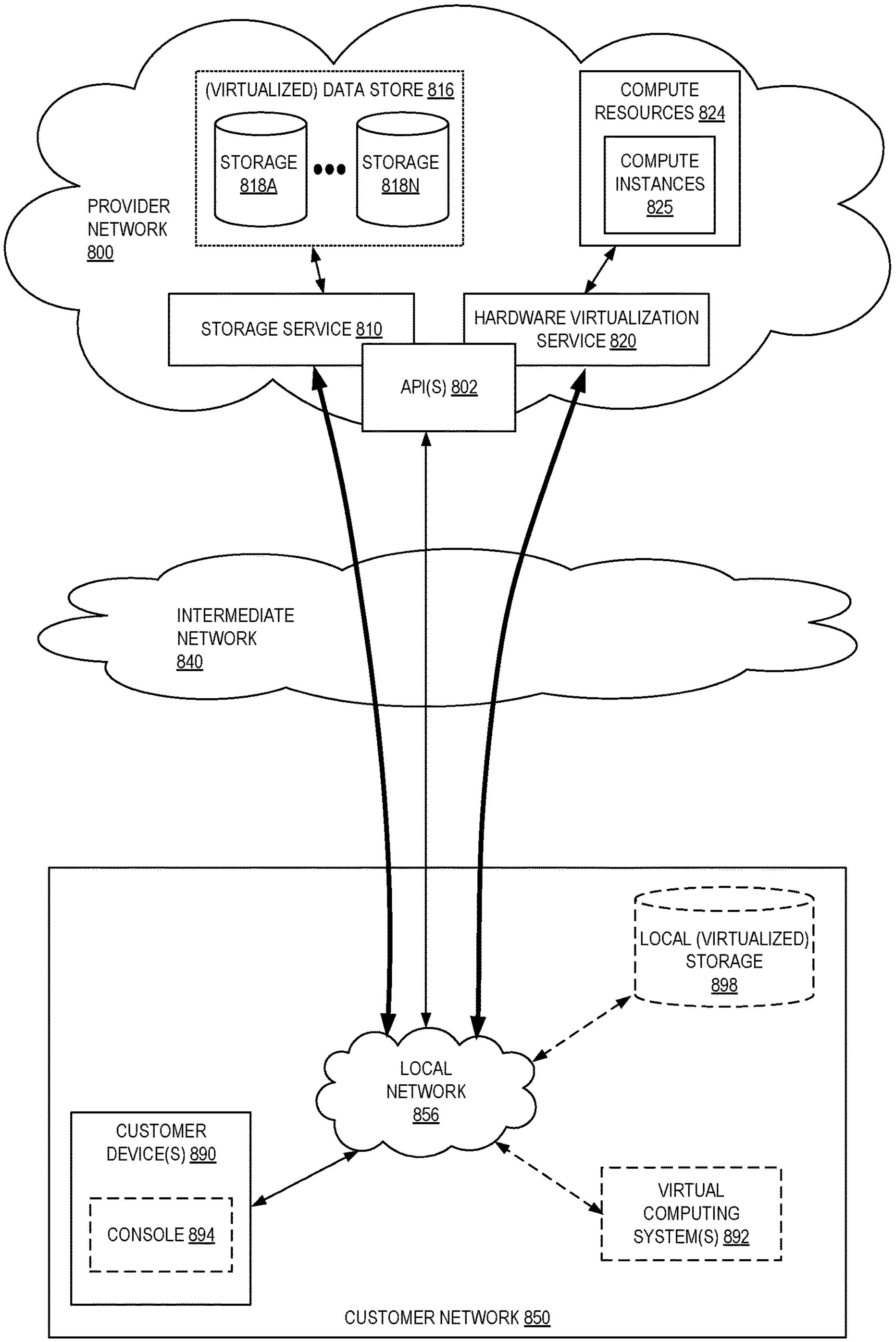
FIG. 8 is a block diagram of an example provider network that provides a storage service and a hardware virtualization service to customers according to some embodiments.

FIG. 8 is a block diagram of an example provider network environment that provides a storage service and a hardware virtualization service to customers, according to some embodiments. A hardware virtualization service 820 provides multiple compute resources 824 (e.g., compute instances 825, such as VMs) to customers. The compute resources 824 can, for example, be provided as a service to customers of a provider network 800 (e.g., to a customer that implements a customer network 850). Each computation resource 824 can be provided with one or more local IP addresses. The provider network 800 can be configured to route packets from the local IP addresses of the compute resources 824 to public Internet destinations, and from public Internet sources to the local IP addresses of the compute resources 824.

The provider network 800 can provide the customer network 850, for example coupled to an intermediate network 840 via a local network 856, the ability to implement virtual computing systems 892 via the hardware virtualization service 820 coupled to the intermediate network 840 and to the provider network 800. In some embodiments, the hardware virtualization service 820 can provide one or more APIs 802, for example a web services interface, via which the customer network 850 can access functionality provided by the hardware virtualization service 820, for example via a console 894 (e.g., a web-based application, standalone application, mobile application, etc.) of a customer device 890. In some embodiments, at the provider network 800, each virtual computing system 892 at the customer network 850 can correspond to a computation resource 824 that is leased, rented, or otherwise provided to the customer network 850.

From an instance of the virtual computing system(s) 892 and/or another customer device 890 (e.g., via console 894), the customer can access the functionality of a storage service 810, for example via the one or more APIs 802, to access data from and store data to storage resources 818A-818N of a virtual data store 816 (e.g., a folder or "bucket," a virtualized volume, a database, etc.) provided by the provider network 800. In some embodiments, a virtualized data store gateway (not shown) can be provided at the customer network 850 that can locally cache at least some data, for example frequently accessed or critical data, and that can communicate with the storage service 810 via one or more communications channels to upload new or modified data from a local cache so that the primary store of data (the virtualized data store 816) is maintained. In some embodiments, a user, via the virtual computing system 892 and/or another customer device 890, can mount and access virtual data store 816 volumes via the storage service 810 acting as a storage virtualization service, and these volumes can appear to the user as local (virtualized) storage 898.

While not shown in FIG. 8, the virtualization service(s) can also be accessed from resource instances within the provider network 800 via the API(s) 802. For example, a customer, appliance service provider, or other entity can access a virtualization service from within a respective virtual network on the provider network 800 via the API(s) 802 to request allocation of one or more resource instances within the virtual network or within another virtual network.

Illustrative Systems

Figure 9:
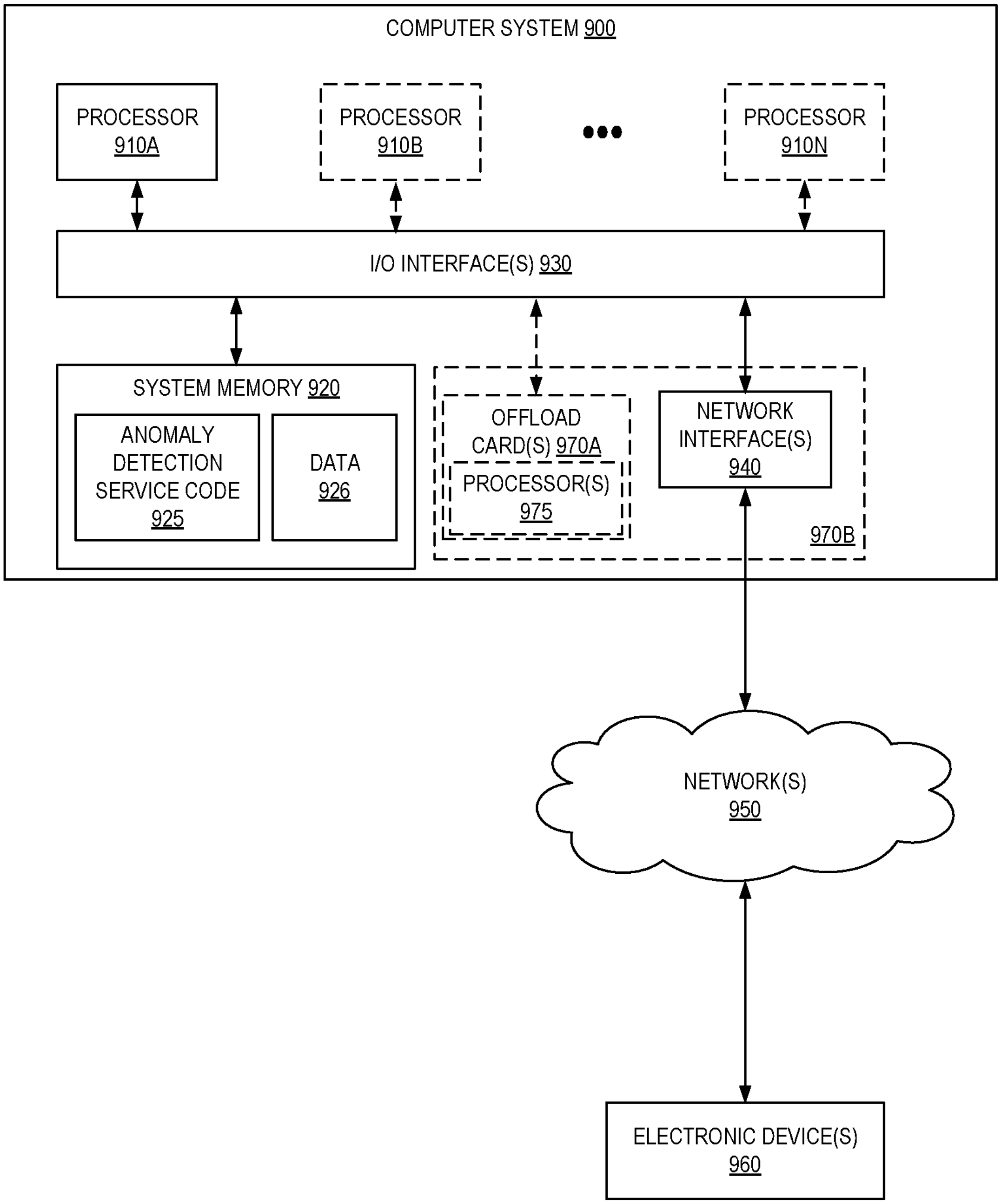
FIG. 9 is a block diagram illustrating an example computer system that can be used in some embodiments.

In some embodiments, a system that implements a portion or all of the techniques described herein can include a general-purpose computer system, such as the computer system 900 illustrated in FIG. 9, that includes, or is configured to access, one or more computer-accessible media. In the illustrated embodiment, the computer system 900 includes one or more processors 910 coupled to a system memory 920 via an input/output (I/O) interface 930. The computer system 900 further includes a network interface 940 coupled to the I/O interface 930. While FIG. 9 shows the computer system 900 as a single computing device, in various embodiments the computer system 900 can include one computing device or any number of computing devices configured to work together as a single computer system 900.

In various embodiments, the computer system 900 can be a uniprocessor system including one processor 910, or a multiprocessor system including several processors 910 (e.g., two, four, eight, or another suitable number). The processor(s) 910 can be any suitable processor(s) capable of executing instructions. For example, in various embodiments, the processor(s) 910 can be general-purpose or embedded processors implementing any of a variety of instruction set architectures (ISAs), such as the x86, ARM, PowerPC, SPARC, or MIPS ISAs, or any other suitable ISA. In multiprocessor systems, each of the processors 910 can commonly, but not necessarily, implement the same ISA.

The system memory 920 can store instructions and data accessible by the processor(s) 910. In various embodiments, the system memory 920 can be implemented using any suitable memory technology, such as random-access memory (RAM), static RAM (SRAM), synchronous dynamic RAM (SDRAM), nonvolatile/Flash-type memory, or any other type of memory. In the illustrated embodiment, program instructions and data implementing one or more desired functions, such as those methods, techniques, and data described above, are shown stored within the system memory 920 as anomaly detection service code 925 (e.g., executable to implement, in whole or in part, the anomaly detection service 114) and data 926.

In some embodiments, the I/O interface 930 can be configured to coordinate I/O traffic between the processor 910, the system memory 920, and any peripheral devices in the device, including the network interface 940 and/or other peripheral interfaces (not shown). In some embodiments, the I/O interface 930 can perform any necessary protocol, timing, or other data transformations to convert data signals from one component (e.g., the system memory 920) into a format suitable for use by another component (e.g., the processor 910). In some embodiments, the I/O interface 930 can include support for devices attached through various types of peripheral buses, such as a variant of the Peripheral Component Interconnect (PCI) bus standard or the Universal Serial Bus (USB) standard, for example. In some embodiments, the function of the I/O interface 930 can be split into two or more separate components, such as a north bridge and a south bridge, for example. Also, in some embodiments, some or all of the functionality of the I/O interface 930, such as an interface to the system memory 920, can be incorporated directly into the processor 910.

The network interface 940 can be configured to allow data to be exchanged between the computer system 900 and other devices 960 attached to a network or networks 950, such as other computer systems or devices as illustrated in FIG. 1, for example. In various embodiments, the network interface 940 can support communication via any suitable wired or wireless general data networks, such as types of Ethernet network, for example. Additionally, the network interface 940 can support communication via telecommunications/telephony networks, such as analog voice networks or digital fiber communications networks, via storage area networks (SANs), such as Fibre Channel SANs, and/or via any other suitable type of network and/or protocol.

In some embodiments, the computer system 900 includes one or more offload cards 970A or 970B (including one or more processors 975, and possibly including the one or more network interfaces 940) that are connected using the I/O interface 930 (e.g., a bus implementing a version of the Peripheral Component Interconnect-Express (PCI-E) standard, or another interconnect such as a QuickPath interconnect (QPI) or UltraPath interconnect (UPI)). For example, in some embodiments the computer system 900 can act as a host electronic device (e.g., operating as part of a hardware virtualization service) that hosts compute resources such as compute instances, and the one or more offload cards 970A or 970B execute a virtualization manager that can manage compute instances that execute on the host electronic device. As an example, in some embodiments the offload card(s) 970A or 970B can perform compute instance management operations, such as pausing and/or un-pausing compute instances, launching and/or terminating compute instances, performing memory transfer/copying operations, etc. These management operations can, in some embodiments, be performed by the offload card(s) 970A or 970B in coordination with a hypervisor (e.g., upon a request from a hypervisor) that is executed by the other processors 910A-910N of the computer system 900. However, in some embodiments the virtualization manager implemented by the offload card(s) 970A or 970B can accommodate requests from other entities (e.g., from compute instances themselves), and cannot coordinate with (or service) any separate hypervisor.

In some embodiments, the system memory 920 can be one embodiment of a computer-accessible medium configured to store program instructions and data as described above. However, in other embodiments, program instructions and/or data can be received, sent, or stored upon different types of computer-accessible media. Generally speaking, a computer-accessible medium can include any non-transitory storage media or memory media such as magnetic or optical media, e.g., disk or DVD/CD coupled to the computer system 900 via the I/O interface 930. A non-transitory computer-accessible storage medium can also include any volatile or non-volatile media such as RAM (e.g., SDRAM, double data rate (DDR) SDRAM, SRAM, etc.), read only memory (ROM), etc., that can be included in some embodiments of the computer system 900 as the system memory 920 or another type of memory. Further, a computer-accessible medium can include transmission media or signals such as electrical, electromagnetic, or digital signals, conveyed via a communication medium such as a network and/or a wireless link, such as can be implemented via the network interface 940.

Various embodiments discussed or suggested herein can be implemented in a wide variety of operating environments, which in some cases can include one or more user computers, computing devices, or processing devices which can be used to operate any of a number of applications. User or client devices can include any of a number of general-purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially available operating systems and other known applications for purposes such as development and database management. These devices also can include other electronic devices, such as dummy terminals, thin-clients, gaming systems, and/or other devices capable of communicating via a network.

Most embodiments use at least one network that would be familiar to those skilled in the art for supporting communications using any of a variety of widely-available protocols, such as Transmission Control Protocol/Internet Protocol (TCP/IP), File Transfer Protocol (FTP), Universal Plug and Play (UPnP), Network File System (NFS), Common Internet File System (CIFS), Extensible Messaging and Presence Protocol (XMPP), AppleTalk, etc. The network(s) can include, for example, a local area network (LAN), a wide-area network (WAN), a virtual private network (VPN), the Internet, an intranet, an extranet, a public switched telephone network (PSTN), an infrared network, a wireless network, and any combination thereof.

In embodiments using a web server, the web server can run any of a variety of server or mid-tier applications, including HTTP servers, File Transfer Protocol (FTP) servers, Common Gateway Interface (CGI) servers, data servers, Java servers, business application servers, etc. The server(s) also can be capable of executing programs or scripts in response requests from user devices, such as by executing one or more Web applications that can be implemented as one or more scripts or programs written in any programming language, such as Java®, C, C# or C++, or any scripting language, such as Perl, Python, PHP, or TCL, as well as combinations thereof. The server(s) can also include database servers, including without limitation those commercially available from Oracle®, Microsoft®, Sybase®, IBM®, etc. The database servers can be relational or non-relational (e.g., "NoSQL"), distributed or non-distributed, etc.

Environments disclosed herein can include a variety of data stores and other memory and storage media as discussed above. These can reside in a variety of locations, such as on a storage medium local to (and/or resident in) one or more of the computers or remote from any or all of the computers across the network. In a particular set of embodiments, the information can reside in a storage-area network (SAN) familiar to those skilled in the art. Similarly, any necessary files for performing the functions attributed to the computers, servers, or other network devices can be stored locally and/or remotely, as appropriate. Where a system includes computerized devices, each such device can include hardware elements that can be electrically coupled via a bus, the elements including, for example, at least one central processing unit (CPU), at least one input device (e.g., a mouse, keyboard, controller, touch screen, or keypad), and/or at least one output device (e.g., a display device, printer, or speaker). Such a system can also include one or more storage devices, such as disk drives, optical storage devices, and solid-state storage devices such as random-access memory (RAM) or read-only memory (ROM), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or web browser. It should be appreciated that alternate embodiments can have numerous variations from that described above. For example, customized hardware might also be used and/or particular elements might be implemented in hardware, software (including portable software, such as applets), or both. Further, connection to other computing devices such as network input/output devices can be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, Electrically Erasable Programmable Read-Only Memory (EEPROM), flash memory or other memory technology, Compact Disc-Read Only Memory (CD-ROM), Digital Versatile Disk (DVD) or other optical storage, magnetic cassettes, magnetic tape, magnetic disk storage or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

In the preceding description, various embodiments are described. For purposes of explanation, specific configurations and details are set forth in order to provide a thorough understanding of the embodiments. However, it will also be apparent to one skilled in the art that the embodiments can be practiced without the specific details. Furthermore, well-known features can be omitted or simplified in order not to obscure the embodiment being described.

Bracketed text and blocks with dashed borders (e.g., large dashes, small dashes, dot-dash, and dots) are used herein to illustrate optional operations that add additional features to some embodiments. However, such notation should not be taken to mean that these are the only options or optional operations, and/or that blocks with solid borders are not optional in certain embodiments.

Reference numerals with suffix letters can be used to indicate that there can be one or multiple instances of the referenced entity in various embodiments, and when there are multiple instances, each does not need to be identical but may instead share some general traits or act in common ways. Further, the particular suffixes used are not meant to imply that a particular amount of the entity exists unless specifically indicated to the contrary. Thus, two entities using the same or different suffix letters might or might not have the same number of instances in various embodiments.

References to "one embodiment," "an embodiment," "an example embodiment," etc., indicate that the embodiment described can include a particular feature, structure, or characteristic, but every embodiment can not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Moreover, in the various embodiments described above, unless specifically noted otherwise, disjunctive language such as the phrase "at least one of A, B, or C" is intended to be understood to mean either A, B, or C, or any combination thereof (e.g., A, B, and/or C). Similarly, language such as "at least one or more of A, B, and C" (or "one or more of A, B, and C") is intended to be understood to mean A, B, or C, or any combination thereof (e.g., A, B, and/or C). As such, disjunctive language is not intended to, nor should it be understood to, imply that a given embodiment requires at least one of A, at least one of B, and at least one of C to each be present.

Unless otherwise explicitly stated, articles such as "a" or "an" should generally be interpreted to include one or multiple described items. Accordingly, phrases such as "a device configured to" or "a computing device" are intended to include one or multiple recited devices. Such one or more recited devices can be collectively configured to carry out the stated operations. For example, "a processor configured to carry out operations A, B, and C" can include a first processor configured to carry out operation A working in conjunction with a second processor configured to carry out operations B and C.

The specification and drawings are, accordingly, to be regarded in an illustrative rather than a restrictive sense. It will, however, be evident that various modifications and changes can be made thereunto without departing from the broader spirit and scope of the disclosure as set forth in the claims.

What is claimed is:

1. A computer-implemented method comprising:

receiving, at an anomaly detection service implemented as anomaly detection service code executed by one or more processors, one or more requests to perform anomaly detection;

creating, by a model trainer of the anomaly detection service, an anomaly detection machine learning model by:

training the anomaly detection machine learning model to generate reconstruction vectors from labeled training data including labeled normal training data and labeled attack training data, generating the reconstruction vectors from the labeled training data while minimizing an anomaly score on the labeled normal training data and maximizing the anomaly score on the labeled attack training data, clustering the reconstruction vectors into two or more clusters, estimating a distribution of anomaly scores that have been generated based on the reconstruction vectors and the two or more clusters;

performing inference on a received request of the one or more requests to perform anomaly detection by:

calculating an anomaly score for the received request based on reconstruction vectors and clusters generated from the request by the trained anomaly detection machine learning model, and determining whether the received request is anomalous based on anomaly score with respect to a distribution threshold determined from the distribution of anomaly scores estimated during training of the anomaly detection machine learning model; and performing one or more actions in response to determining whether the received request is anomalous.

2. The computer-implemented method of claim 1, wherein the labeled data for the loss function includes normal and anomalous labeled data.

3. The computer-implemented method of claim 1, wherein the anomaly detection machine learning model is a modified conditional Wasserstein autoencoder.

4. A computer-implemented method comprising:

creating, by a model trainer of the anomaly detection service, by a model trainer of an anomaly detection service implemented as anomaly detection service code executed by one or more processors, an anomaly detection machine learning model by:

training the anomaly detection machine learning model to generate reconstruction vectors from labeled training data including labeled normal training data and labeled attack training data, generating the reconstruction vectors from the labeled training data while minimizing an anomaly score on the labeled normal training data and maximizing the anomaly score on the labeled attack training data, and clustering the reconstruction vectors into two or more clusters; and performing inference on a received request by:

calculating an anomaly score for the received request based on reconstruction vectors and clusters generated from the request by the trained anomaly detection machine learning model, and determining whether the received request is anomalous based on an anomaly score with respect to a threshold determined from a distribution of anomaly scores estimated during training of the anomaly detection machine learning model.

5. The computer-implemented method of claim 4, wherein clustering the reconstruction vectors utilizes k-means.

6. The computer-implemented method of claim 4, wherein the labeled data for the loss function includes normal and anomalous labeled data.

7. The computer-implemented method of claim 4, wherein the loss function component for unlabeled data includes a maximum mean discrepancy (MMD) value.

8. The computer-implemented method of claim 4, wherein the reconstruction vectors include contextual information including one or more of account privileges, user type information, a location from which the request was received, and a timestamp indicating when the request was received.

9. The computer-implemented method of claim 4, wherein the reconstruction vectors include content information including one or more of authentication information, user agent, and organization information.

10. The computer-implemented method of claim 4, wherein the anomaly detection machine learning model is an autoencoder.

11. The computer-implemented method of claim 4, further comprising in response to determining whether the received request is anomalous based on the anomaly score with respect to the distribution of anomaly scores, halting the request from being performed by computing resources.

12. The computer-implemented method of claim 4, further comprising in response to determining whether the received request is non-anomalous based on the anomaly score with respect to the distribution of anomaly scores, allowing the request to be performed by computing resources.

13. The computer-implemented method of claim 4, further comprising receiving a request to configure anomaly detection usage.

14. The computer-implemented method of claim 13, wherein the request to configure anomaly detection usage comprises one or more of the following: information to identify content and context features to use for training and/or inference, an indication of a threshold to use for an anomaly score, an indication of what clustering algorithm to use, and an indication of what action(s) to take upon a detected anomaly.

15. A system comprising:

a first one or more electronic devices to implement a model hosting service in a multi-tenant provider network; and a second one or more electronic devices to implement an anomaly detection service in the multi-tenant provider network, the anomaly detection service implemented as anomaly detection service code that upon execution by one or more processors cause the anomaly detection service to:

create, by a model trainer of the anomaly detection service, an anomaly detection machine learning model by:

training the anomaly detection machine learning model to generate reconstruction vectors from labeled training data including labeled normal training data and labeled attack training data, generate the reconstruction vectors from the labeled training data while minimizing an anomaly score on the labeled normal training data and maximizing the anomaly score on the labeled attack training data, and cluster the reconstruction vectors into two or more clusters; and perform inference on a received request to use the model hosting service to:

calculate an anomaly score for the received request based on reconstruction vectors and clusters generated from the request by the trained anomaly detection machine learning model, and determine whether the received request is anomalous based on an anomaly score with respect to a threshold determined from a distribution of anomaly scores estimated during training of the anomaly detection machine learning model.

16. The system of claim 15, wherein the anomaly detection service is further configured to configure anomaly detection usage in response to a request that comprises one or more of the following: information to identify content and context features to use for training and/or inference, an indication of a threshold to use for an anomaly score, an indication of what clustering algorithm to use, and an indication of what action(s) to take upon a detected anomaly.

17. The system of claim 15, wherein the anomaly detection service is further configured to, in response to determining whether the received request is non-anomalous based on the anomaly score with respect to the distribution of anomaly scores, allow the request to be performed by computing resources.

18. The system of claim 15, wherein the anomaly detection service is further configured to, in response to determining whether the received request is anomalous based on the anomaly score with respect to the distribution of anomaly scores, halt the request from being performed by computing resources.

19. The system of claim 15, wherein the anomaly detection machine learning model is an autoencoder.

20. The system of claim 15, wherein the labeled data for the loss function includes normal and anomalous labeled data.

* * * * *